Oct. 5, 1937.   J. H. KNAPP   2,095,033

ELECTRIC BOILER

Filed Feb. 11, 1936   2 Sheets-Sheet 1

Inventor
JOSEPH H. KNAPP
By Thomas L. Wilder
Attorney

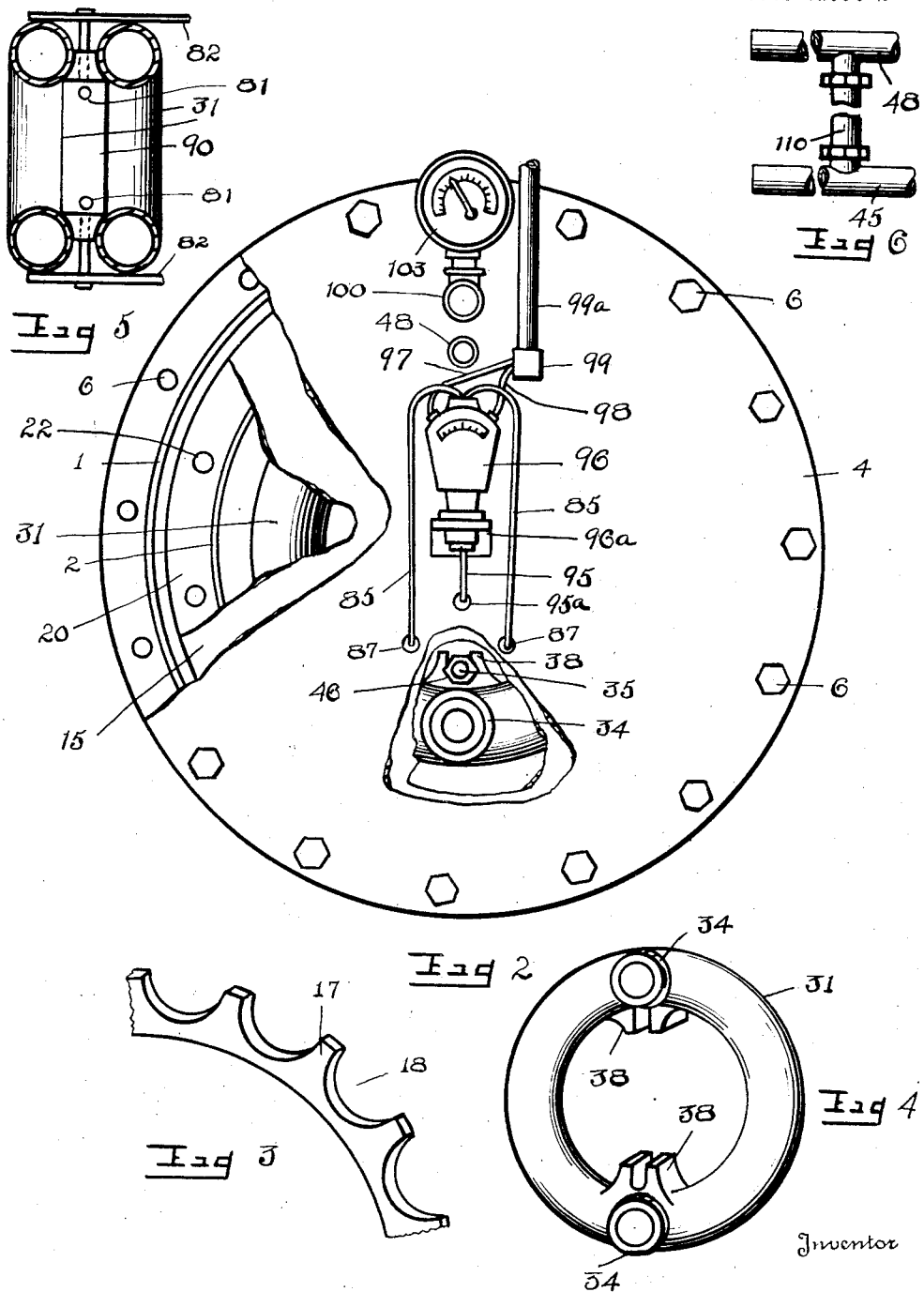

Patented Oct. 5, 1937

2,095,033

UNITED STATES PATENT OFFICE 2,095,033

ELECTRIC BOILER

Joseph H. Knapp, Utica, N. Y., assignor of forty-nine percent to Thomas C. Redmond, Utica, N. Y.

Application February 11, 1936, Serial No. 63,386

7 Claims. (Cl. 122—4)

My invention relates to an electric boiler and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide an electric boiler which can be used for water, vapor or steam heat. It is designed to dispose the heating element in a complete vacuum, whereby to conserve to the maximum degree the heat generated by an electric current. In this respect it avoids the objectionable feature of allowing the heat to escape up the chimney as heretofore in the case of hot water heaters and boilers.

To accomplish this conservation of heat the boiler is encased and constructed somewhat on a principle of a thermos bottle.

The object will be understood from the drawings in which,

Fig. 2 is a front elevation showing parts broken away.

Fig. 3 is a detail view showing a fragment of a star supporting bushing employed.

Fig. 4 is a detail view somewhat reduced in scale showing one of the boiler sections.

Fig. 5 is a detail view somewhat reduced in scale showing a modification of the heating element employed.

Fig. 6 is a detail view of certain connecting pipes showing a modification of the arrangement thereof, parts being broken away.

Figure 1:
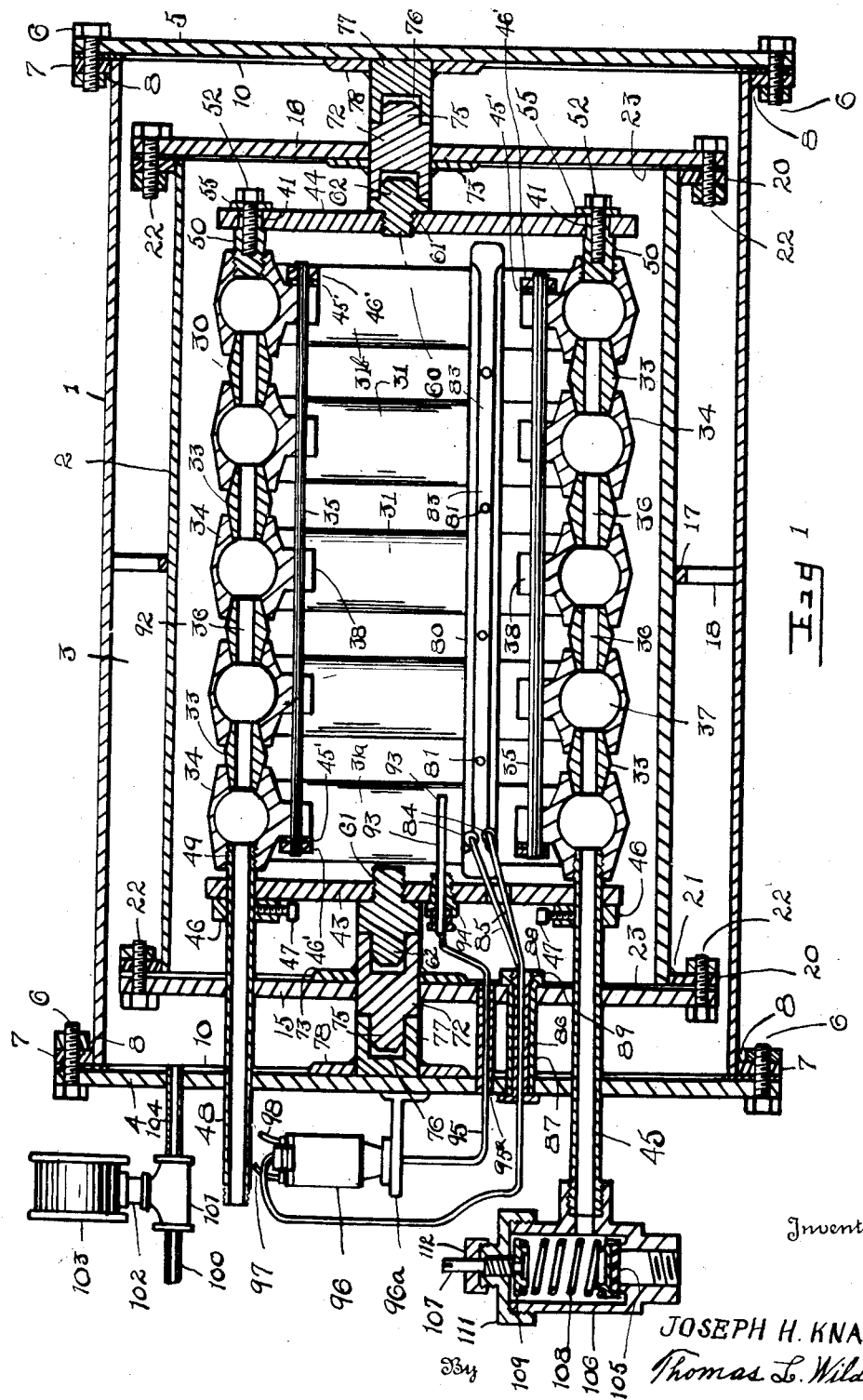
Fig. 1 is a vertical longitudinal section of the boiler showing parts in full.

Referring more particularly to the drawings the boiler embodies an outer casing 1 and an inner casing 2 which are sealed from the atmosphere to form an inner vacuum chamber 3 therebetween, whereby to effect a thermo-boiler that will conserve the heat generated by the electric heat element hereinafter mentioned to the maximum degree. Casings 1 and 2 are cylindrical in shape. The ends of casing 1 are closed by large disc shaped annular members 4 and 5 respectively. Each of the ends 4 and 5 is secured to cylindrical casing 1 by bolts or rivets 6. To this end an annular ring 7 is welded with V shaped welds at 8 to each end of casing 1 to form a circumferential flange to which each of the end members 4 and 5 are bolted by said rivets 6 above mentioned. A gasket 10 is employed in each instance.

Suspended within casing 1 is cylindrical casing 2 above mentioned which is smaller in diameter than casing 1, whereby to provide vacuum chamber 3 therebetween. Casing 2 has each of its opposite ends closed by disc shaped members 15 and 16 respectively. End discs 15 and 16 are secured to casing 2 in the same manner as end discs 4 and 5 are to casing 1. In this instance annular rings 20, 20 are attached in each instance to the casing 2 by V welds at 21, whereby to form circumferential flanges to which is bolted at 22 end discs 15 and 16. A gasket 23 is employed in each instance here also as in sealing the ends of casing 1. A star disc 17 or one having peripheral arc shaped openings 18 is employed to hold cylindrical casings 1 and 2 in spaced relation adjacent their central longitudinal locations. The arc shaped openings 18 form air passages to allow for the passage of the air, whereby not to obstruct or divide the vacuum chamber 3.

Within casing 2 is suspended with air space thereabout the boiler 30. Boiler 30 comprises a plurality of annular sections 31. Sections 31 are joined together and their passageways communicate with each other by nipples 33, 33 used therebetween in each instance. Each of the nipples 33, is formed with a double truncated surface which inclines in opposite directions and engages corresponding apertures in the heads 34 of each of the sections 31, whereby they can be wedged into place to effect a drive fit that will be sufficiently secure to permanently attach sections 31 together. Nipples 33 are disposed at diametrically opposite positions relative to sections 31. Each of the nipples 33 has a central conduit or passageway 36 that communicates with the annular conduit or passageway 37 of each of the adjacent sections 31 whereby all of the nipples 33 in conjunction with the passageways of sections 31 form manifolds for the unobstructed flow of the water at diametrically opposite locations.

The end sections 31a, 31b, are attached to annular plates 43 and 44 respectively. Sections 31 are in communication with a water line pipe 45 which has its inner end screw threaded at 46 to head 34 in section 31a. Pipe 45 passes through an aperture in annular plate 43. It is held in position by collar 46 and set screw 47. Likewise outlet steam or water pipe 48 passes through an aperture in plate 43 and is screw threaded at 49 to head 34 of section 31a.

The opposite end section 31b is attached to annular plate 44 by means of screw threaded plugs 50 that engage screw threaded apertures in heads 34b in end section 31b. Plugs 50 are reduced at 41 to engage plate 44 through which they pass at diametrically opposite positions. Screw bolts 52, 52 engage threaded apertures on plugs 50, 50, whereby to hold said plugs tightly to annular plate 44. Washers 55 are employed in each instance.

The means for suspending boiler 30 within casing 2 embodies arbors or gudgeons 60, 60 which are screw threaded at 61, 61 to plates 43 and 44 respectively. Furthermore, arbors 60 are disposed in alignment with each other and little off center relative to plates 43 and 44, whereby the greater weight of boiler 30 will be lowermost relative to said arbors 60. This will tend to prevent the swinging of boiler 30 with the consequent loosening of contiguous joints thereof.

Each of the arbors 60 is reduced at 62, 62 to fit snugly into a central annular open aperture or matrix formed in the cooperating member 72, 72. Each of the cooperating members 72 has a bearing in end closing discs 15 and 16 respectively. A plate 73 is welded with a V weld to each of the members 72 and to end discs 15 and 16 respectively, whereby to hold said members 72, 72 rigidly to the inside contiguous surface of end discs 15 and 16.

The inner reduced ends of arbor 60 are chamfered or beveled into truncated conical shape to aid in assembly and also to provide a vacuum chamber within that part of the cooperating member 72 that has the matrix.

Furthermore, members 72, 72 are reduced at 75 to form projections that fit snugly in each instance into an aperture or matrix 76 made in auxiliary arbors 77, 77. A plate 78 is welded by a V weld to each of the auxiliary arbors 77 and to the inside surface of end discs 4 and 5, whereby to rigidly hold said auxiliary arbors 77, 77 in place on said end closing discs 4 and 5 respectively.

Moreover, sections 31 are held together by stay rods 35, 35 which pass through an inwardly extended open slotted part 38 formed on each of the sections 31. Sections 31 being circular leave openings through their central portions, whereby to allow for the free passage of air. Stay rods 35, 35 are held in position by washers 45', 45' and nuts 46', 46' in each instance.

The means for heating boiler 30 embodies one or more electric heating units or elements 80 which is disposed longitudinally across the interior openings of boiler 30 and fastened thereto by bolts 81 engaging said element 80 and also a parallel strip 82 mounted on the opposite side of sections 31 of boiler 30.

Heating element 80 comprises a nickel chromium ribbon or spiral wire embedded in a refractory material 83 under great hydraulic pressure as described in U. S. Letters Patent Nos. 1,614,330 and 1,614,938. It is connected at 84, 84 in electric circuit by wires 85, 85 which extend out through insulated bushings 86, 86 disposed through cooperating sleeves 87, 87 that project outwardly through aligned apertures made in end discs 4 and 15. Sleeves 87, 87 are welded to the contiguous surfaces of end disc 4. Furthermore, bushings 86, 86 are screw threaded at 88, 88 to the headed part 89 of sleeves 87, 87.

In place of the rectangular shape of heating element 80, two semicircumferential elements shaped as 90, 90 shown in Fig. 5 may be used. These two will be disposed between the contiguous surfaces of boiler sections 31, 31 to fill the circle. Furthermore, heating elements 90, 90 will be electrically connected in series, whereby one or both sets can be electrified to regulate the amount of electricity used for heating boiler 30. The lower set 90 is connective to one electric circuit and the upper set 90 to another. Sets 90, 90 are electrically connective in series relative to each other, whereby the heat within the boiler chamber 92 can be controlled in a predetermined ratio in accordance with degree of heat required.

The means for controlling the degree of heat within the boiler embodies the bulb 93 which is disposed within heat chamber 92. It extends partially across section 31a of boiler 30. It is mounted to plate 43 through which it projects by means of stuffing box 94. A tube 95 is attached at one end to bulb 93 and its other to temperature control thermostat 96. Tube 95 passes through sleeve 95a which projects through aligned apertures made in end members 4 and 15 and is welded thereto. Thermostat 96 is connected by wires 97, 98 with an electric source. Wires 97 and 98 are conducted to the source through outlet box 99 and conduit 99a. Outlet box 99 is mounted to end member 4. Thermostat 96 is mounted on bracket 96a attached to end member 4.

The means for effecting a vacuum within vacuum chamber 3 embodies a vacuum pump, not shown, connected to pipe 100 which has a union joint at 101 with pipe 102 leading to vacuum gage 103 and pipe 104 leading to the interior of vacuum chamber 3 through casing 4. Pipe 104 projects through end disc 4 and is welded with a V weld thereto.

The means for regulating the amount of water in boiler 30 embodies an automatic spring pressed valve 105 connected to intake water pipe 45. Valve 105 is enclosed in casing 106. A set screw 107 can be adjusted to control the degree of tension of coiled spring 108 that presses at one end against valve 105 and at the other against cap 109 loosely mounted on the lower end of screw bolt 107. Screw 107 is mounted in cover 111 screw threaded to casing 106. There is also a cap 112 screw threaded to cover 111. Casing 106 is screw threaded to inlet pipe 45. Valve 105 is set against a twenty pound or any other predetermined pressure in boiler 30, whereby to determine the amount of water entering said boiler. When the pressure in boiler 30 falls below twenty pounds, valve 105 will open to allow more water to enter boiler sections 31.

In operation the person using the boiler which has been installed in his home will touch an electric button, whereby to effect an electric circuit through heating element 80 in the chamber 92 of boiler 30. The heat generated in heating element 80 will be disbursed through the interior of chamber 92, whereby to heat sections 31 of boiler 30. It cannot escape therefrom, however, in view of its being sealed and in view of vacuum chamber 3. Therefore, all the heat can be utilized to heat the water within sections 31. This will start a circulation of the water which enters by way of intake pipe 45 and emerges by way of outlet pipe 48 to the radiators, not shown, in the several rooms of the house.

It will be observed that as the cold water enters pipe 45 it will have a straight passageway through the lower ends of all of the sections 31 and corresponding nipples 33 and will tend to fill the space therebetween.

In this construction of boiler 30 it will be observed that as the water becomes heated and rises in sections 31, it can flow out through outlet pipe 48 without re-entering the cold water below as heretofore in an endless coil arrangement where the water enters in one end of coil and flows out the opposite end. This is due to the manifold formed by the continuous passageway through 36 of nipples 33 and 37 of sections 31.

When the temperature rises to a certain degree Fahrenheit the mechanism of the thermostat control 96 will automatically throw off the electric switch, not shown, and thereby break the electric circuit until a predetermined lower degree Fahrenheit is reached when the electric switch, not shown, will be automatically thrown in again.

The vacuum chamber 3, will be kept constant by a vacuum pump, not shown, heretofore mentioned. The pump is automatically controlled by gage 103, which makes an electric circuit as the vacuum lowers and cuts out the electric circuit when the vacuum reaches a predetermined pressure indicated by said gage 103.

In the modified form of heating element 30, shown in Fig. 5 each set of heat elements 90, 90 can be thrown in simultaneously or severally to control the degree of heat within the chamber 92.

It will be observed that the structure can be easily taken apart for repair or cleaning purposes; that the boiler 30 being built in sections can likewise be separated into its several parts.

In the event it is desirable to have steam heat, water gage 110 will connect inlet pipe 45 with outlet pipe 48, whereby to indicate the level of water in sections 31 of boiler 30.

Having thus described my invention what I claim as new and desire to secure by Letters Patent is as follows:

1. In a boiler, a plurality of removable annular sections having head members to allow for connections, nipples having conduits engaging said head members, whereby to join said sections and form continuous aligned passageways therebetween, end plates attached to said sections, arbors engaging said end plates, members having apertures for engaging said arbors and other members for engaging said last named members, whereby to hold said sections in suspended position.

2. In a boiler, a plurality of removable annular sections having head members to allow for connections, nipples having double truncated surfaces engaging said annular sections to form continuous aligned passageways between said sections, plates attached to said sections, arbors engaging said plates, members having apertures for engaging said arbors, whereby to hold said sections in suspended position, said last members having reduced portions, other members having apertures for engaging said reduced portions of said members, plates adjacent said first named plates and said last members mounted to said end plates, whereby to hold the aforesaid parts in suspended position.

3. In a boiler, a plurality of removable annular sections having head members to allow for connections, nipples having conduits engaging said head members, whereby to join said sections to form continuous aligned surfaces therebetween, end plates attached to said sections, arbors engaging said end plates, members having apertures carrying said arbors, whereby to hold said sections in suspended position, said sections having extended parts with open slots and stayrods engaging said parts, whereby to aid in holding said sections together.

4. In a boiler of the class described, a plurality of spaced annular sections, means interconnecting said annular sections to permit circulation of water therethrough, electrical heating means extending throughout substantially the entire axial length of said units at one side thereof and in direct contact therewith whereby heat energy is conveyed to water in said sections, an inlet for water to said sections, and an outlet for heated water from said sections.

5. In a boiler of the class described, a plurality of spaced annular sections, means interconnecting said annular sections to permit circulation of water therethrough, a plurality of electrical heating means extending throughout substantially the entire axial length of said units at one side thereof and in direct contact therewith whereby heat energy is conveyed to said sections, a heat insulating casing completely encasing said sections, an inlet for water to said sections, and an outlet for heated water from said sections.

6. In a boiler of the class described, a plurality of spaced annular sections of relatively small capacity, means interconnecting said annular sections to permit circulation of water therethrough, electrical heating means extending throughout substantially the entire axial length of said units at one side thereof and in direct contact therewith whereby heat energy is conveyed to water in said sections, a double-walled vacuum casing surrounding said sections on all sides thereof, an inlet for water to said sections and an outlet for heated water from said sections.

7. In a boiler of the class described, a plurality of spaced annular sections having relatively small capacity, means interconnecting said annular sections to permit circulation of water therethrough, a plurality of electrical heating elements extending throughout substantially the entire axial length of said units at one side thereof and in direct contact therewith, said electrical heating elements being adapted to generate heat throughout their entire length whereby heat is conveyed to said sections at the points of contact between said sections and said heating elements and whereby heat is radiated from said elements to the spaces between said sections, a casing surrounding said sections in close proximity thereto effective to reflect heat to said sections, a second casing spaced from and surrounding said first casing, means for maintaining a vacuum between said casings, an inlet for water to said sections, and an outlet for heated water from said sections.

JOSEPH H. KNAPP.